UNITED STATES PATENT OFFICE 2,332,896

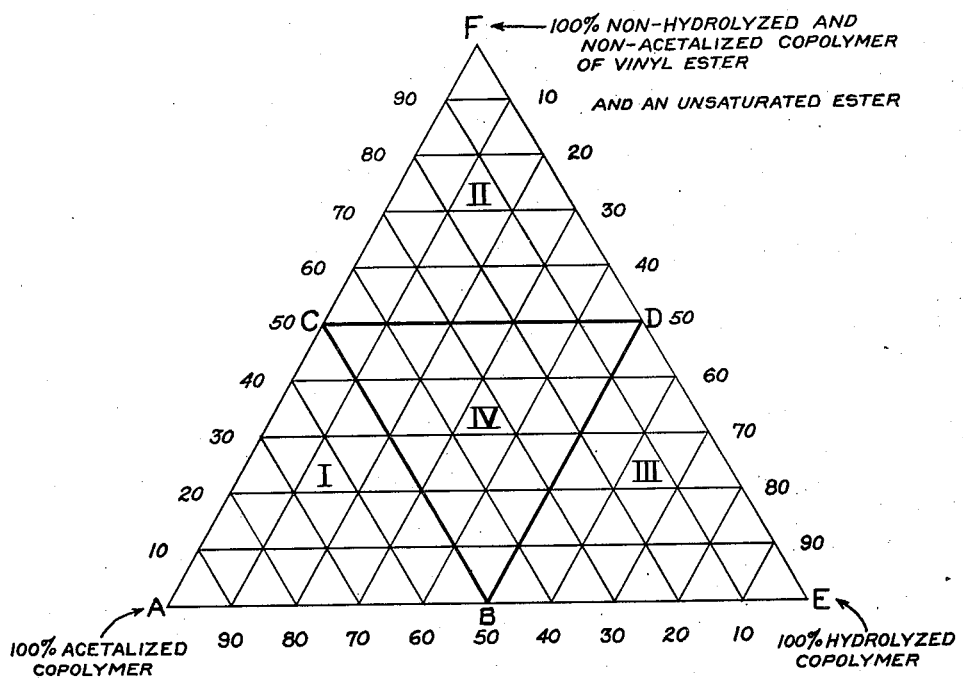

SYNTHETIC COMPOSITION COMPRISING HYDROLYZED ACETALIZED COPOLYMERS OF VINYL ESTERS AND UNSATURATED ORGANIC ESTERS

Gaetano F. D'Alelio, Pittsfield, Mass., assignor to General Electric Company, a corporation of New York Application May 29, 1940, Serial No. 337,869

2 Claims. (Cl. 260—73)

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, a ketalized, or an acetalized and ketalized copolymer (or copolymers) of a plurality of copolymerizable materials, one of which is a vinyl ester having at least one $$CH_2=C\diagdown$$

grouping and another of which is an unsaturated organic ester containing a $$CH_2=C\diagdown$$

grouping and at least one other polymerizable grouping, specifically another $$CH_2=C\diagdown$$

grouping.

It has been suggested heretofore that synthetic compositions may be prepared by partially hydrolyzing (saponifying) a mixed polymerization product of two different vinyl esters (or a vinyl ester and an ester of acrylic acid), each of said esters having a single $$CH_2=C\diagdown$$

grouping and no other polymerizable grouping, and reacting the partially hydrolyzed product with an aldehyde or a ketone to introduce acetal or ketal groups into the product. The mixed polymerization product used as a starting reactant is of the thermoplastic (heat-softening) type and its properties are, in large part, carried through to the final acetalized or ketalized product. As a result, such products are limited in their utility and are unsatisfactory for many applications of synthetic plastics and of synthetic coating compositions.

I have discovered that synthetic compositions which are different from, and in many respects superior to, organic artificial masses heretofore known can be produced by acetalizing, ketalizing or acetalizing and ketalizing a hydrolyzed copolymer of a plurality of copolymerizable materials, one of which is a vinyl ester having at least one

grouping (e. g., vinyl formate, vinyl acetate, etc.) and another of which is an unsaturated organic ester containing a

grouping and at least one other polymerizable grouping, specifically another

grouping. Examples of such organic esters are diallyl itaconate, diallyl azelaate, methallyl methacrylate, etc.

When such a vinyl ester (hereafter for brevity designated generally as "vinyl ester") is copolymerized with such an unsaturated organic ester cross-linkage takes place. Thus, a copolymer of vinyl acetate and diallyl oxalate has the graphic structure

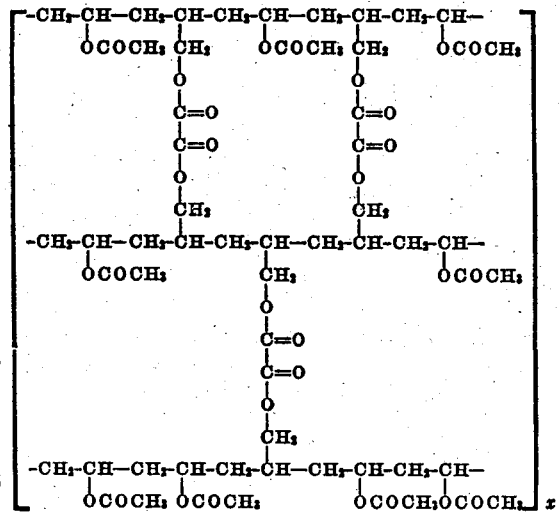

These cross-linked copolymers of the vinyl esters and organic esters are superior in many respects to polymerized vinyl esters alone. When cross-linked, they become infusible and substantially insoluble in all the ordinary solvents. For example, a copolymer of 1% diallyl oxalate and 99% vinyl acetate is infusible and is insoluble in alcohol, benzene, acetone, acetic acid, etc. In marked contrast, polyvinyl acetate is thermoplastic (fusible) and is soluble in alcohol, acetone, acetic acid diluted with water, etc. The impact and flexural strengths of the cross-linked copolymers of the vinyl esters and unsaturated organic esters employed in this invention also are much higher than the linear polymers of vinyl esters having only one

grouping and no other polymerizable grouping and the linear polymers obtained by polymerizing mixtures of different vinyl esters (or mixtures of vinyl esters and acrylic esters), each of which esters has only one

grouping and no other polymerizable grouping The disadvantage in the practical utilization of these cross-linked copolymers of vinyl esters and unsaturated organic esters having a plurality of

groupings has been that they could not be molded to the desired shape after copolymerizing to an insoluble, infusible state.

The present invention is based on my discovery that a cross-linked copolymer of a vinyl ester having at least one

grouping and an unsaturated organic ester containing a plurality of

groupings, even though such copolymer is infusible and is substantially insoluble in all the ordinary solvents, can be acetalized, ketalized or acetalized and ketalized to give products of outstanding properties. I have found that products thereby obtained carry with them the advantages of the cross-linked copolymer plus the important added advantage that they become sufficiently thermoplastic that, unlike the starting copolymer reactant, they can be molded under heat and pressure to a desired shape. That copolymers which have been acetalized, ketalized or acetalized and ketalized would have this property, which may be described as "semi-thermoplasticity," was quite surprising and unpredictable.

In carrying my invention into effect I hydrolyze a copolymer of a vinyl ester having at least one

grouping and a material copolymerizable therewith comprising an unsaturated organic ester having a plurality of

groupings and cause the hydrolyzed copolymer to react with a

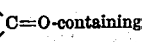

organic compound selected from the class consisting of aldehydes, ketones and mixtures of aldehydes and ketones until at least some of the hydroxyl groups have been replaced by the corresponding acetal, ketal or acetal and ketal groups. For example, I may hydrolyze the copolymer to at least 10 per cent, more particularly from 25 to 100 per cent of that theoretically possible, and acetalize, ketalize or acetalize or ketalize the hydrolyzed copolymer until at least 10 per cent of the hydroxyl groups of the hydrolyzed copolymer have been replaced by the corresponding acetal, ketal or acetal and ketal groups. In some cases, for instance where resistance to water is of secondary consideration, the hydrolyzed copolymer may have only a minor proportion (that is, less than 50 per cent) of its hydroxyl groups replaced by acetal, ketal or acetal and ketal groups. For most applications, however, it is usually desirable that at least 50 per cent, say 60 to 100 per cent, of the hydroxyl groups of the hydrolyzed copolymer be replaced by acetal, ketal or acetal and ketal groups. Particularly valuable products are obtained when the copolymer is hydrolyzed to from 50 to 100 per cent of that theoretically possible and the hydrolyzed copolymer is acetalized, ketalized or acetalized and ketalized until from 75 to 100 per cent of the hydroxyl groups of the hydrolyzed copolymer have been replaced by acetal, ketal or acetal and ketal groups.

In order that those skilled in the art better may understand how to practice this invention, the following more detailed description is given:

*Preparation of copolymer*

In effecting copolymerization between the vinyl ester and the unsaturated organic ester the components are mixed and interpolymerized in the presence or absence of a polymerization catalyst. Preferably a polymerization catalyst is used. Examples of such catalysts are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, mixed peroxides, e. g., acetyl benzoyl peroxide, acetyl stearyl peroxide, etc., various per-compounds such as perborates, persulfates, perchlorates, etc., aluminum salts such as the halides, e. g., aluminum chloride, etc., organic and inorganic acids such as methacrylic, hydrofluoric, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the components is of secondary consideration, copolymerization may be effected merely under the influence of heat, light, or heat and light and in the absence of a polymerization catalyst.

The rate of copolymerization and the properties of the copolymer reactant vary with the time, concentration and, if a catalyst is used, also with the catalyst concentration, as well as upon the particular monomers or partial polymers employed in preparing the copolymer and the proportions thereof. Copolymerization may be effected at from room temperature (20° to 30° C.) to temperatures above 100° C., for example about 130° C., but ordinarily I use temperatures within the range of 60° to 120° C. in causing the mixed components to interpolymerize to a cross-linked copolymer.

Mainly for economic reasons I prefer to use not more than 50 per cent by weight (of the mixture) of the organic ester having a plurality of

groupings in forming the copolymer reactant, and generally use less than 30 per cent, for example from 0.1 to 10 per cent. The particular proportions employed are dependent to a large extent upon the particular starting components and the particular properties desired in the finished product.

In certain cases, instead of copolymerizing a single vinyl ester at least one

grouping with one or more unsaturated organic esters having a plurality of

groupings, I may copolymerize a plurality of such vinyl esters with a single such organic ester or with a plurality of such unsaturated esters. Also, in some cases, other organic materials which are copolymerizable with the vinyl ester (or esters) and the unsaturated ester (or esters) may be incorporated into the mixture and the whole copolymerized (interpolymerized) to form a cross-linked copolymer reactant of improved utility in the production of an acetalized, ketalized or acetalized and ketalized copolymer of particular properties. Examples of such modifying bodies which may be used in producing the copolymer reactant are maleate esters, fumarate esters, vinyl ketones, acrylonitriles, acrylaldehydes, unsaturated ethers having at least one

grouping, etc.

Illustrative examples of vinyl esters having at least one

grouping, in addition to those previously mentioned, which may be used in preparing the starting copolymer reactant, are the vinyl esters of saturated and unsaturated, aliphatic and aromatic, monobasic and polybasic acids, more specifically the vinyl esters of the following acids: chloroacetic, propionic, bromopropionic, butyric, isobutyric, valeric, caproic, heptylic, caprylic, nonylic, capric, oleic, palmitic, stearic, acrylic, alkacrylic (e. g., methacrylic, ethacrylic, etc.), crotonic, oxalic, malonic, succinic, glutaric, adipic, pimelic, suberic, azelaic, sebacic, benzoic, toluic, phenyl acetic, phthalic, terephthalic, benzoyl phthalic, benzophenone-2,4' dicraboxylic, cinnamic, tricarballylic, tartaric, citric, lactic, etc., including the alpha unsaturated alpha beta polycarboxylic acids, e. g., maleic, monohalomaleic, fumaric, monohalofumaric, citraconic, mesaconic, acetylene dicarboxylic, aconitic, itaconic, etc. Additional examples of vinyl esters which may be used are vinyl hexahydrobenzoate, vinyl propyl succinate, vinyl butyl phthalate, vinyl diethyl citrate, trivinyl citrate, vinyl phenyl acetate, divinyl o-phenylene diacetate, divinyl phenyl butyrate o-carboxylate, trivinyl trimesate and vinyl-o-toluylate, the structural formulas for which are shown in my copending application Serial No. 336,981, filed May 24, 1940, and assigned to the same assignee as the present invention.

In some cases it is of particular advantage to use vinyl esters containing a

grouping and at least one other polymerizable grouping, e. g., another

grouping. Numerous examples of such vinyl esters have been given above.

Illustrative examples of unsaturated organic esters having a plurality of

groupings, in addition to those previously mentioned, which may be used in preparing the starting copolymer reactant, are the unsaturated (ethylenic and acetylenic) alcohol polyesters of saturated and unsaturated, aliphatic and aromatic polycarboxylic acids, the saturated alcohol polyesters of polymerizable unsaturated, aliphatic and aromatic polycarboxylic acids having a plurality of

groupings, the polymerizable unsaturated monohydric alcohol esters of unsaturated, aliphatic and aromatic monocarboxylic acids, etc. Examples of saturated alcohol ester radicals of such esters are the radicals of methyl, ethyl, propyl, butyl, isobutyl, ethylene glycol, diethylene glycol, glycerol, etc., alcohols. Examples of unsaturated alcohol ester radicals of such esters are the radicals of vinyl, methyl-vinyl allyl, 1-chlorallyl, 2-chlor-allyl, 3-methyl allyl, phenyl allyl, cinnamyl, crotyl, propargyl, etc., alcohols. Examples of saturated and unsaturated, aliphatic and aromatic, monocarboxylic and polycarboxylic acid radicals of such esters are the radicals of the acids above mentioned with particular reference to the vinyl ester component of the copolymer. More specific examples of unsaturated organic esters having a plurality of

groupings and their corresponding formulas are shown below:

Crotyl acrylate

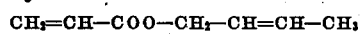

Tetramethylene glycol dimethacrylate

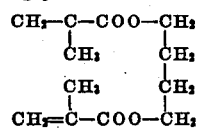

Erythrityl tetra-acrylate

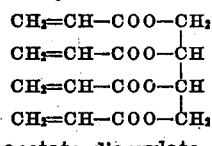

Glyceryl monoacetate diacrylate

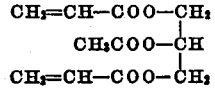

Diallyl oxalate
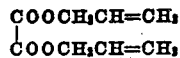

Diallyl phthalate
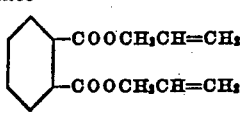

Diallyl carbinyl acetate
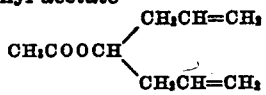

Diallyl methyl carbinyl crotonate
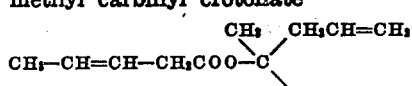

Propargyl methacrylate
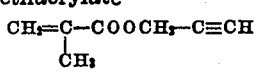

Diallyl succinate
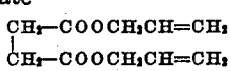

Allyl crotyl phthalate
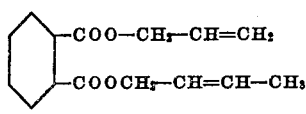

Divinyl glutarate
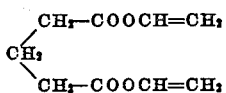

Dimethallyl allyl citrate
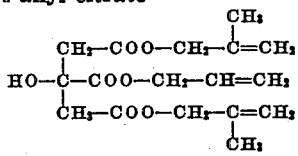

Diallyl styrl succinate
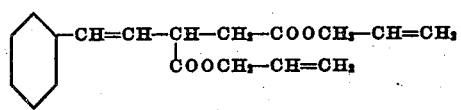

Divinyl hexahydrophthalate
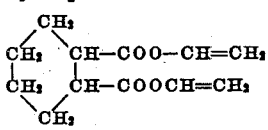

Diallyl p-phenylene diacrylate
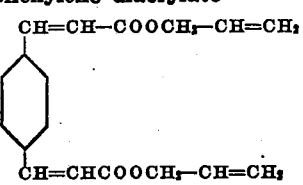

Diallyl dichlor hexahydro-p-phenylene diacetate
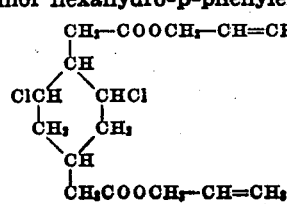

Glycerol dimethacrylate
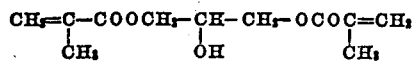

Glycol diacrylate
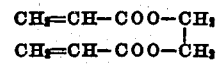

Allyl acrylate

Vinyl methacrylate
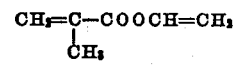

Beta-chlor allyl crotonate
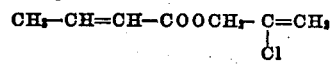

Dimethyl allyl carbinyl acrylate
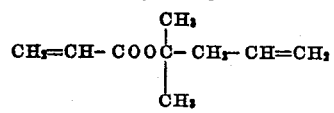

*Treatment of copolymer*

The cross-linked copolymers may be partially or completely hydrolyzed and thereafter acetalized, ketalized or acetalized and ketalized; or, the partial or complete acetalization, ketalization or acetalization and ketalization of the copolymer may be caused to take place simultaneously with the partial or complete hydrolysis of the copolymer.

When the copolymer is hydrolyzed separately from the acetalization, ketalization or acetalization and ketalization reaction, this may be done, for example, by heating the copolymer with water and a suitable catalyst, examples of which are strong alkalies (e. g., sodium and potassium hydroxides, tetra-alkyl ammonium hydroxides, etc.) and strongly acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially re-esterified if the hydrolysis has been carried farther than desired), then is acetalized, ketalized or acetalized and ketalized by causing it to react under acid conditions with an aldehyde, a ketone, a mixture of different aldehydes, a mixture of different ketones, or a mixture of a single aldehyde and a single ketone or of a plurality of different aldehydes and different ketones. The reaction is continued until the desired percentage of hydroxyl groups in the hydrolyzed copolymer have been replaced by acetal, ketal or acetal and ketal groups. The acetalized product then is isolated from the reaction mass, washed and dried.

Preferably I conduct the acetalization, ketalization or acetalization and ketalization reaction, under acid conditions, simultaneously with the hydrolysis of the copolymer. This may be done, for example, by treating the copolymer with water, an acidic catalyst (examples of which are given in the preceding paragraph) and an organic compound containing or engendering an active carbonyl

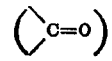

grouping, e. g., aldehydes, ketones, etc. Preferably the reaction is carried out in the presence of a liquid medium adapted to cause a molecular dispersion of the reaction product, e. g., in acetic acid, propionic acid, liquid (or liquefiable) monohydric alcohols, e. g., ethyl alcohol, butyl alcohol, amyl alcohol, etc., mixtures of liquid alcohols, acids and esters, etc. To shorten the time required to acetalize, ketalize or acetalize and ketalize the copolymer, it is desirable to maintain the reactants at an elevated temperature, say 60° to 100° C. or above, the exact temperature depending more or less upon the boiling point of the mixture. Ordinarily the reaction is carried out under reflux at or approaching the boiling point of the reaction mass.

After the conjoint hydrolysis and acetalization, ketalization or acetalization and ketalization reaction has been carried to the desired stage as determined by analysis or by previous experience, the reaction mass usually is mixed with water to which may be added, if desired, a neutralizing agent (e. g., ammonia, sodium and potassium hydroxides and carbonates, etc.) for the acidic bodies. This causes coagulation of the treated copolymer, which thereafter is washed until free of water-soluble materials and then dried. The resulting products can be shaped by the application of heat, pressure or heat and pressure.

As agents for treating the copolymer I may use any aldehyde or ketone or any compound engendering an aldehyde or a ketone, that is, a compound which will be converted to an aldehyde or a ketone during the reaction. Examples of such compounds are formaldehyde, paraformaldehyde, paraldehyde, trioxymethylene, acetaldehyde, propionaldehyde, butyraldehyde, acrolein, methacrolein, crotonaldehyde, benzaldehyde, cinnamic aldehyde, anisaldehyde, p-methoxy phenyl acetaldehyde, furfural, acetone, chloroacetone, methyl ketone, divinyl ketone, methyl ethyl ketone, acetophenone, benzophenone, quinone, tetrahydroquinone, benzil, benzoyl acetone, acetyl dibenzoyl methane, benzal acetophenone, mesityl oxide, shogaol chlorohexanone, vanillin, zingerone, alpha-oxy-tetra-hydronaphthalene, paeonol, etc.

The properties, for example hardness, of the acetalized, ketalized or acetalized and ketalized copolymer are considerably influenced by the particular treating agent used. Thus, for the same cross-linked copolymer and the same degree of hydrolysis and acetalization, formaldehyde will yield a harder acetalized copolymer than propionaldehyde. On the other hand, acrolein and furfural yield more solvent-resistant copolymers than formaldehyde. Mixtures of different aldehydes or of different ketones or of aldehydes and ketones may be used in certain cases to impart particular properties to the reaction product. In such modifications, the mixed treating agents may be caused to react together upon the hydrolyzed copolymer, the hydrolysis being carried out first and reaction with the $$\diagdown C\text{O-containing}\diagup$$

compound afterwards, or hydrolysis and condensation with the mixed treating agents may be carried out simultaneously. Or, the hydrolyzed copolymer may be reacted first with one $$\diagdown C=O\text{-containing}\diagup$$

compound and then with another. Or, simultaneous hydrolysis and partial reaction with one $$\diagdown C=O\text{-containing}\diagup$$

compound may be caused to take place, followed by more complete reaction with a different $$\diagdown C=O\text{-containing}\diagup$$

compound.

The properties of the final product depend upon many factors, one of which is the composition of the starting copolymer reactant. For example, a cross-linked copolymer of 0.1 per cent allyl acrylate and 99.9 per cent vinyl acetate yields a final product of lower softening point than does a cross-linked copolymer of 10 per cent allyl acrylate and 90 per cent vinyl acetate. The concentration of the polymerization catalyst and the temperature of polymerization used in the production of the copolymer reactant also influence the properties of the final product. High catalyst concentration and (or) high polymerization temperature yield copolymers of lower molecular weight than result from lower amounts of catalyst and (or) lower polymerization temperatures. These differences are reflected in the reaction products of the copolymer with a $$\diagdown C=O\text{-containing}\diagup$$

organic compound.

By varying the time and temperature of reaction and the concentration of the catalytic agent and of the $$\diagdown C=O\text{-containing}\diagup$$

compound, it is possible to vary the extent of hydrolysis and the reaction of the copolymer with the $$\diagdown C=O\text{-containing}\diagup$$

compound. If the hydrolysis is carried out in the absence of a $$\diagdown C=O\text{-containing}\diagup$$

compound, the extent of hydrolysis also may be controlled by carrying hydrolysis farther than is ultimately desired and then reesterifying the excess hydroxyl groups. In re-esterifying, a different acid than that produced in the hydrolysis may be used thereby further to alter the properties of the final product.

The properties of the final product also may be varied by varying the extent of hydrolysis, the extent of the reaction with the $$\diagdown C=O\text{-containing}\diagup$$

compound and the ratio of hydroxyl groups to substituent groups and the ratio of each to the number of ester groups remaining in the molecule. For example, two products with entirely different properties will result from the same cross-linked copolymer reactant if, in one case, the hydrolysis is carried to 90 per cent of that theoretically possible and then 45 per cent of the available hydroxyl groups are acetalized, ketalized or acetalized and ketalized, while in the other case the hydrolysis is carried to 45 per cent of that theoretically possible and then 90 per cent of the available hydroxyl groups are acetalized, ketalized or acetalized and ketalized.

This will be more clearly understood from a consideration of the accompanying drawing showing a triangular coordinate graph and from the following discussion of the same.

The point F on this graph designates the starting copolymer reactant which is 100 per cent non-hydrolyzed and non-acetalized, that is, a copolymer which has not been hydrolyzed and has not been treated with a $$\diagdown C{=}O\text{-containing}\diagup$$

compound; the point E designates a 100 per cent hydrolyzed copolymer; and the point A, a 100 per cent acetalized, ketalized or acetalized and ketalized copolymer. The area I, designated by the triangle ABC, covers compositions of particular utility in the production of molding compositions and electrically insulating materials. Those compositions within this area which contain less than 20 per cent of hydroxyl groups, of the maximum theoretically possible on complete hydrolysis, are particularly useful in the production of wire enamels. The area II, designated by the triangle CDF, covers compositions having properties more closely approaching those of the starting copolymer reactant than those compositions covered by areas I, III and IV. In general, such compositions require higher heat and pressure for shaping than those of the other areas. The area III, designated by the triangle BED, covers compositions of lesser resistance to water than the compositions of the other areas. These compositions are more easily dispersed in water. They are particularly adapted for use in the production of water-dispersible and hydroxylated-solvent-dispersible adhesives. The area IV, designated by the triangle BCD (middle section of the graph), covers compositions having properties intermediate those falling within the other areas. The properties of any particular composition within this area approach those of the compositions falling within the area to which it is nearest.

It will be understood, of course, that the deductions which may be made from this graph are only general and that other variable influences in the production of the treated copolymer may cause some variations. The graph, however, does show the wide variations that are possible in the preparation of the new synthetic compositions of this invention and, in a general way, how the properties of the final product may be varied by varying the extent of hydrolysis and the extent of the reaction with the $$\diagdown C{=}O\text{-containing}\diagup$$

compound.

The properties of these new artificial masses may be varied in still other ways. For example, their properties may be varied by carrying out the reaction with the $$\diagdown C{=}O\text{-containing}\diagup$$

compound in the presence of other reactants such, for instance, as organic compounds capable of forming a methylol derivative as an intermediate during the resin formation or other compounds capable of reacting with the $$\diagdown C{=}O\text{-containing}\diagup$$

compound or with the reaction product of the $$\diagdown C{=}O\text{-containing}\diagup$$

compound and the hydrolyzed copolymer. Examples of such modifying reactants which may be used as such, or in the form of their methylol or methylene derivatives are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, styryl phenol, indene phenol, coumar phenol, resorcinol, chlorophenol, chlorophenyl phenol, chlorostyryl phenol, etc.; hydroxy aromatic esters, e. g., hydroxy benzoates, hydroxy phenyl acetates, hydroxy phenyl propionates, hydroxy cinnamates, etc.; hydroxy aromatic ethers, e. g., hydroquinone mono-ethers, guiacols, etc.; monohydric and polyhydric alcohols, e. g., ethyl, propyl, isopropyl, butyl, amyl, etc., alcohols, ethylene glycol, diethylene glycol, glycerine, pentaerythritol, trimethylol nitro methane, etc.; amides, both mono-amides and polyamides, e. g., formamide, acetamide, stearamide, malonic diamide, succinic diamide, adipic diamide, phthalic diamide, citric triamide, itaconic diamide, sulfonamides such as toluene sulfonamide, benzamide, urea and its homologues and derivatives and substances of the nature of urea, e. g., thiourea, methyl urea, tertiary amyl urea, phenyl thiourea, guanidine, biguanide, guanyl urea, triazines, pseudothiourea, melamine, etc.; amines, e. g., ethylene diamine, aniline, phenylene diamine, amino phenols, etc.

The following more specific examples are given in order to illustrate more clearly how the present invention may be carried into effect. All parts are by weight.

*Example 1*

Fifteen parts of a cross-linked copolymer made by interpolymerizing 50 parts diallyl azelate and 50 parts vinyl acetate were reacted for 144 hours at 70° C. with

| | Parts |
|---|---|
| Aqueous solution of formaldehyde (approximately 37.1% HCHO) | 10 |
| Concentrated sulfuric acid | 1 |
| Acetic acid | 100 |

This yielded a clear, molecular dispersion which, after precipitation and washing, gave a very soft, thermoplastic resin that melts down almost completely when heated at 140° C.

*Example 2*

Seventeen parts of a cross-linked copolymer made by interpolymerizing 99.9 parts vinyl acetate and 0.1 part methallyl methacrylate were reacted for 120 hours at 70° C. with

| | Parts |
|---|---|
| Chloroacetone | 11 |
| Water | 4 |
| Concentrated hydrochloric acid | 1 |
| Acetic acid | 100 |

This resulted in a very viscous, molecular dispersion of the acetalized copolymer in acetic acid. On precipitating in water containing sufficient ammonia to neutralize the mineral acid and washing the precipitated copolymer until free from water-soluble components, followed by drying, a hard thermoplastic resin, which was quite soft at 150° C., was obtained.

Example 3

Ten parts of a cross-linked copolymer made by interpolymerizing 99.9 parts vinyl acetate and 0.1 part diallyl itaconate were reacted for 21 hours at 100° C. with

| | Parts |
|---|---|
| Aqueuos formaldehyde (approximately 37.1% HCHO) | 8 |
| Concentrated sulfuric acid | 0.3 |
| Acetic acid | 80 |

After precipitation and washing of the resinous reaction product, a very hard resin having a high flow point was obtained.

Example 4

Ten parts of a cross-linked copolymer made by interpolymerizing 99.9 parts vinyl acetate and 0.1 part methallyl methacrylate were heated for 44 hours at 95° C. with

| | Parts |
|---|---|
| Aqueous formaldehyde (approximately 37.1% HCHO) | 4.68 |
| Concentrated sulfuric acid | 0.5 |
| Acetic acid | 80 |

After precipitation and washing, following by drying, a thermoplastic, very tough resin was obtained.

Example 5

Ten parts of a cross-linked copolymer made by interpolymerizing 99.9 parts vinyl acetate and 0.1 part methallyl methacrylate were reacted by 21 hours at 100° C. with

| | Parts |
|---|---|
| n-Butanal (butyraldehyde) | 10.1 |
| Water | 8 |
| Concentrated sulfuric acid | 0.5 |
| Acetic acid | 100 |

After precipitation, washing and drying, a rubbery resin that became sticky when heated at 150° C. was obtained.

Example 6

Ten parts of a cross-linked copolymer made by interpolymerizing 99.9 parts vinyl acetate and 0.1 part diallyl itaconate were reacted for 22 hours at 105° C. with

| | Parts |
|---|---|
| n-Butanal | 5.8 |
| Water | 10 |
| Concentrated sulfuric acid | 0.5 |
| Acetic acid | 120 |

After precipitation, washing and drying, a very hard resin that could be shaped when heated at 150° C. was obtained.

Example 7

Ten parts of a cross-linked copolymer made by interpolymerizing 99.9 parts vinyl acetate and 0.1 part diallyl itaconate were reacted at 90° to 100° C. for 43 hours with

| | Parts |
|---|---|
| Acetaldehyde | 3.5 |
| Water | 10 |
| Sulfuric acid (concentrated) | 0.5 |
| Acetic acid | 120 |

After precipitation, washing and drying, a horny, thermoplastic resin was obtained.

Example 8

Ten parts of a cross-linked copolymer made by interpolymerizing 99.9 parts vinyl acetate and 0.1 part diallyl itaconate were reacted at 90° to 100° C. for 43 hours with

| | Parts |
|---|---|
| Propanal (propionaldehyde) | 4.6 |
| Water | 10 |
| Concentrated sulfuric acid | 0.5 |
| Acetic acid | 120 |

After precipitation, washing and drying, a resin similar to the product of Example 7 was obtained, although it was slightly softer.

Example 9

Ten parts of a cross-linked copolymer made by inter-polymerizing 85 parts vinyl acetate, 15 parts ethyl methacrylate and 0.5 part diallyl itaconate were heated at 110° C. for 30 hours with

| | Parts |
|---|---|
| Aqueous formaldehyde (approximately 37.1% HCHO) | 4.8 |
| Concentrated sulfuric acid | 0.5 |
| Acetic acid | 80 | yielding, after precipitating, washing and drying, a brittle resin that became quite soft and sticky when heated at 150° C.

Example 10

Eight parts of a cross-linked copolymer made by inter-polymerizing 99.5 parts vinyl acetate and 0.5 part diallyl oxalate were reacted at 80° C. for 40 hours with

| | Parts |
|---|---|
| Aqueous formaldehyde (approximately 37.1% HCHO) | 4.4 |
| Concentrated sulfuric acid | 0.25 |
| Acetic acid | 55 | yielding, after precipitating, washing and drying, a very hard, thermoplastic resin.

Example 11

Seventeen parts of a cross-linked copolymer made by interpolymerizing 99.9 parts vinyl acetate and 0.1 part methallyl methacrylate were reacted for 120 hours at 70° C. with

| | Parts |
|---|---|
| Benzyl p-hydroxy benzoate | 23 |
| Aqueous formaldehyde (approximately 37.1% HCHO) | 18 |
| Concentrated sulfuric acid | 1 |
| Acetic acid | 100 | yielding a gel which, after washing and drying, was converted into a rubbery, thermoplastic resin.

Example 12

Seventeen parts of a cross-linked copolymer made by interpolymerizing 99.9 parts vinyl acetate and 0.1 part methallyl methacrylate were reacted for 120 hours at 70° C. with

| | Parts |
|---|---|
| p-Chlor-m-cresol | 14 |
| Aqueous formaldehyde (approximately 37.1% HCHO) | 18 |
| Concentrated sulfuric acid | 1 |
| Acetic acid | 100 | yielding a cream-colored paste which, after washing and drying, was converted into a hard, semi-thermoplastic, brownish resin.

Example 13

Seventeen parts of a cross-linked copolymer made by interpolymerizing 99.9 parts vinyl acetate and 0.1 part methallyl methacrylate were reacted for 120 hours at 70° C. with

| | Parts |
|---|---|
| Phthalimide | 16 |
| Aqueous formaldehyde (approximately 37.1% HCHO) | 18 |
| Concentrated sulfuric acid | 1 |
| Acetic acid | 100 | yielding, after precipitation, washing and drying, a hard, very tough resin. This resin softened when heated at 150° C. It was light cream-colored and did not discolor on heating.

*Example 14*

Twenty parts of a cross-linked copolymer made by interpolymerizing 50 parts diallyl azelate and 50 parts vinyl acetate were reacted for 144 hours at 70° C. with

| | Parts |
|---|---|
| p-Chlorphenol | 13 |
| Butanal | 15 |
| Water | 5 |
| Concentrated hydrochloric acid | 1 |
| Acetic acid | 100 | yielding a homogeneous black gel which, after washing and drying, was converted into a very rubbery, thermoplastic black resin.

The fundamental synthetic compositions of this invention may be varied widely by introducing various modifying bodies during or after reaction of the hydrolyzed copolymer with the

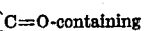C=O-containing compound. These modifying bodies may take the form of high molecular weight bodies, with or without resinous characteristics, for example, hydrolyzed wood products, lignin, proteins, protein-aldehyde condensation products, furfural condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the super-polyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate hexoate, glycol acetate benzoate, glycol di-acetoacetate, etc.; esters of furfuryl and tetrahydrofurfuryl alcohols, e. g., furfuryl and tetrahydrofurfuryl maleates, itaconates, fumarates, salicylates, phthalates, etc., the amide esters of alkanol amines, e. g., esters corresponding to the structural formulas $RCONHCR_2CR_2OCOR$,
$RCON(CR_2CR_2OCOR)_2$ and $N(CR_2CR_2OCOR)_3$ in which formulas R represents hydrogen, alkyl or aryl radicals; the semi-amides or poly-esters, e. g., semi-amides corresponding to the structural formulas

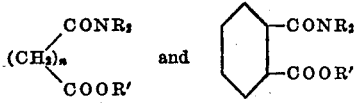

in which formulas $n$ represents 1 or more, R represents hydrogen, alkyl or aryl radicals and R' represents alkyl or aryl radicals; imides, e. g., succinimide, phthalimide, etc.; and similar substances.

The products of this invention may be stabilized against discoloration and made more resistant to decomposition under heat, particularly in the presence of air, by incorporating into the reaction mass or into the intermediate or finished products various inhibiting or stabilizing agents. Examples of such agents which may be used are phenolic bodies, e. g., phenol, resorcinol, catechol, hydroquinone, pyrogallol, phloroglucinol, alpha- and beta-naphthol, cresols, xylenols, carvacrol, thymol, para-tertiary butyl phenol, para-tertiary amyl phenol, para-phenyl phenol, etc.; amines, e. g., ethyl, propyl, butyl and amyl amines and higher members of the homologous series, methyl amyl, ethyl hexyl, iso-propyl butyl amines, etc., alkanol amines, e. g., mono-, di- and tri-ethanol amines, etc., polyamines, e. g., ethylene diamine, tri- and tetramethylene diamines, etc., aromatic primary, secondary and tertiary amines, e. g., phenyl, naphthyl, naphthyl phenyl amines and substitution products of such amines, e. g., benzyl amine, ethyl naphthyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amine-aldehyde condensation products, amide-aldehyde condensation products; and similar substances. The chosen stabilizer (inhibitor) depends largely upon the particular acetalized, ketalized or acetalized and ketalized interpolymer to be stabilized and the particular service application of the finished product. Any suitable amount of stabilizer may be used, but ordinarily only a relatively small proportion, for example from about 0.1 to 3.0 per cent by weight of the acetalized, ketalized or acetalized and ketalized interpolymer, is employed.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The particular filler depends upon the particular application for which the molded article is to be used. As fillers may be employed, for instance, bleached or unbleached wood flour, alpha cellulose in flock form, sheets or cuttings of paper, cloth, canvas, etc., asbestos in powdered or long or short fiber length including defibrated asbestos, powdered or flaked mica, wood chips, short or long wood fibers, synthetic or natural continuous threaded fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. g., 125° to 225° C. and at suitable pressures, e. g., at about 1000 to 20,000 pounds per square inch, usually between about 2000 and 4000 pounds per square inch in compression molding.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, China-wood oil, perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited:

A liquid coating composition comprising an acetalized, a ketalized or an acetalized and ketalized interpolymer of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated interpolymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the new materials of this invention. For example, mica flakes may be cemented and bonded together with an acetalized, ketalized or acetalized and ketalized interpolymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a hydrolyzed copolymer of vinyl acetate and an unsaturated ester having a plurality of

groupings. In such plastic materials the hydroxyl groups of the hydrolyzed copolymer are replaced by butyral groups.

The modified or unmodified products of this invention have a wide variety of other uses, for instance in making interior finishing and construction materials for homes, offices, etc., particularly where high-impact-strength and shock-resistant structures are desired. They also may be molded or otherwise suitably shaped to produce buttons, clock cases, radio cabinets, household utensils, decorative novelties, etc. Some of the synthetic materials of this invention are fiber-forming, that is, they can be drawn into continuous filaments. Such filaments may be made into felted or woven fabrics. The highly acetalized, ketalized or acetalized and ketalized interpolymers are especially adapted for use as water-repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnants for electrical coils and other electrical devices; in the construction of electric circuit interrupters; as insulation for motors, generators and other dynamo-electric machines, e. g., as insulation for coil windings, as slot insulation, in the form of sleevings over electrical connections, as separators between running and starting coil windings, etc.

What I claim as new and desire to secure by Letters Patent of the United States is:

1. The product obtained by simultaneously hydrolyzing and acetalizing an infusible, insoluble copolymer of vinyl acetate and diallyl phthalate.

2. An artificial mass especially adapted for use in the plastics and coating arts, said mass comprising a plasticized, hydrolyzed infusible, insoluble copolymer of vinyl acetate and diallyl phthalate in which at least 50 per cent of the hydroxyl groups have been replaced by formal groups.

GAETANO F. D'ALELIO.

CERTIFICATE OF CORRECTION.

Patent No. 2,332,896.                                                     October 26, 1943.

GAETANO F. D'ALELIO.

It is hereby certified that error appears in the printed specification of the above numbered patent requiring correction as follows: Page 1, first column, line 52, for "hereofore" read --heretofore--; page 2, first column, line 19, after "grouping" second occurrence, insert a period; page 3, first column, line 61, for "dicraboxylic" read --dicarboxylic--; and second column, line 41, for "chlor-allyl" read --chlorallyl--; page 4, first column, line 46, for "styrl" read --styryl--; page 5, first column, lines 64 to 67, inclusive, for " $\geq$CO-containing" read -- $\geq$C=O-containing--; and second column, line 38-39, for "hydrolysts" read --hydrolysis--; line 52, for "reesterifying" read --re-esterifying--; page 6, second column, line 44, for "azelate" read --azelaate--; page 7, first column, line 7, for "Aqueuos" read --Aqueous--; and second column, lines 15 and 29, for "inter-polymerizing" read --interpolymerizing--; line 20, after "HCHO" insert a closing parenthesis; page 8, first column, line 71, for that portion of the formula reading "$CR_3OCOR$" read --$CR_2OCOR$--; and that the said Letters Patent should be read with this correction therein that the same may conform to the record of the case in the Patent Office.

Signed and sealed this 11th day of January, A. D. 1944.

(Seal)
                                                           Henry Van Arsdale,
Acting Commissioner of Patents.